(12) United States Patent
Brower et al.

(10) Patent No.: US 12,116,297 B2
(45) Date of Patent: Oct. 15, 2024

(54) CURING AND INOCULATION OF PASTEURIZED DIGESTATE

(71) Applicant: D.C. Water & Sewer Authority, Washington, DC (US)

(72) Inventors: William Brower, Washington, DC (US); Christopher Peot, Washington, DC (US); Ronald Alexander, Apex, NC (US); Sudhir N. Murthy, Herndon, VA (US)

( * ) Notice: Subject to any disclaimer, the term of this patent is extended or adjusted under 35 U.S.C. 154(b) by 1193 days.

(21) Appl. No.: 16/422,232

(22) Filed: May 24, 2019

(65) Prior Publication Data

US 2019/0359513 A1    Nov. 28, 2019

Related U.S. Application Data

(60) Provisional application No. 62/676,067, filed on May 24, 2018.

(51) Int. Cl.

| | |
|---|---|
| *C02F 11/16* | (2006.01) |
| *A01N 63/10* | (2020.01) |
| *A01N 63/20* | (2020.01) |
| *A01N 63/50* | (2020.01) |
| *C02F 11/02* | (2006.01) |
| *C05F 7/00* | (2006.01) |
| *C05F 11/08* | (2006.01) |
| *C05F 11/10* | (2006.01) |
| *C05F 17/921* | (2020.01) |
| *C05F 17/993* | (2020.01) |
| *C02F 11/13* | (2019.01) |
| *C02F 11/131* | (2019.01) |
| *C02F 11/18* | (2006.01) |

(52) U.S. Cl.
CPC ............. *C02F 11/16* (2013.01); *A01N 63/10* (2020.01); *A01N 63/20* (2020.01); *A01N 63/50* (2020.01); *C02F 11/02* (2013.01); *C05F 7/00* (2013.01); *C05F 11/08* (2013.01); *C05F 11/10* (2013.01); *C05F 17/939* (2020.01); *C05F 17/993* (2020.01); *C02F 11/13* (2019.01); *C02F 11/131* (2019.01); *C02F 11/185* (2013.01)

(58) Field of Classification Search
CPC .. C05F 11/10; C05F 11/08; C05F 7/00; C02F 11/02; C02F 11/16
See application file for complete search history.

(56) References Cited

U.S. PATENT DOCUMENTS

| | | |
|---|---|---|
| 5,269,634 A | 12/1993 | Chynoweth et al. |
| 6,399,359 B1 | 6/2002 | Hofstede |
| 2009/0029448 A1 | 1/2009 | Allain |
| 2013/0015129 A1 | 1/2013 | Mussari |
| 2015/0076058 A1 | 3/2015 | Brooks et al. |

FOREIGN PATENT DOCUMENTS

| | | | |
|---|---|---|---|
| FR | | 2956657 A1 | 8/2011 |
| FR | | 2981087 A1 | 4/2013 |
| WO | WO 2017/174873 A1 | | 10/2017 |
| WO | WO 2017/198834 | * | 11/2017 |

OTHER PUBLICATIONS

International Search Report and Written Opinion from PCT/US19/33966 issued Oct. 1, 2019.

* cited by examiner

*Primary Examiner* — Genevieve S Alley
(74) *Attorney, Agent, or Firm* — Blank Rome LLP (57) ABSTRACT

A product, including digestate, that has been pasteurized through thermal hydrolysis, thermal alkaline hydrolysis, or thermal carbonization is cured to enhance its marketability. Variations of this disclosure include embodiments where pasteurized material is inoculated to further enhance marketability where the inoculation is performed by injecting a fungicide, other means of inoculation by injecting beneficial microorganisms to produce characteristics in digestate that are anti-fungal or produce suitable enzyme cofactors or nutrients to stabilize digestate, injections of vitamins to enhance the ability of plants grown using select digestate to thrive in adverse conditions, injection of chemicals to enhance the ability of digestate to retain heat and prevent freezing during wintry conditions, or any combination thereof. Other embodiments include using recycled waste heat generated from wastewater treatment or another process or solar energy for accelerating the drying process which occurs before, during or after curing.

22 Claims, 5 Drawing Sheets

| Characteristics | Units | Fresh Bloom | Cured Bloom |
|---|---|---|---|
| pH | | 7.8-8.7 | 5.5-7.0 |
| Ammonia | mg/kg (wet weight) | 800 - 1,700 | <1,000 |
| Respiration rate | mg CO2-C/g OM/day | 4.5-12 | <5 |
| Moisture content | % | 70% | 15-50% |
| Inert contaminants | % by weight | <0.5% | <0.5% |
| Electrical conductivity (soluble salts) | mmhos/cm (dry weight) | <9 | <7 |
| Organic matter | % (dry weight) | 56-64% | 50-55% |
| Maturity | Seedling emergence / vigor % | 50-100% / 50-100% | +80% / +80% |
| Class A EQ (pathogens & metals) | | Meet | Meet |

CURING AND INOCULATION OF PASTEURIZED DIGESTATE

The present application claims priority to U.S. Provisional Patent Application No. 62/676,067, filed May 24, 2018. The entire disclosure of U.S. Provisional Patent Application No. 62/676,067 is incorporated herein by reference.

This disclosure generally relates to methods, systems, and apparatuses involving curing and inoculating a product, including but not limited to digestate. The systems, methods, and apparatuses may include steps and components that may be needed to treat digestate to optimal conditions. The steps and components include, but are not limited to, detecting criteria such as moisture, conductivity, ammonia, pH, and maturity, in order for adjustments to be made to a curing method, so that the finished product has one or more desirable characteristics.

It is known to use a wastewater treatment system to produce thermally-hydrolyzed digested biosolids (pasteurized digestate). Thermal hydrolysis streams, anaerobic digesters, and belt filter presses may be used to produce such pasteurized digestate. The inventors have found that pasteurized digestate which receives no further processing beyond dewatering on a belt filter press yields a biosolids cake which is approximately 31% solids. The inventors have also found that, although such cake has many advantages, it may be perceived as slightly too wet, and too sticky, for some landscaping and other home and garden uses. In addition, the inventors have found that other characteristics of the biosolids cake can be remarkably improved. There is a need in the art for a biosolids material or other digestate, and a method and apparatus for making it, which is more suitable for landscaping and other home and garden uses.

SUMMARY

This disclosure relates to a system, method, and apparatus for producing a product, and especially for curing digestate that has been pasteurized (through a process that includes, but is not limited to, thermal hydrolysis (heating to a temperature>100 C and less than 175 C), thermal alkaline hydrolysis (use of alkaline material such as lime, caustic, magnesia, or a combination thereof), or thermal carbonization (>175 C)) to enhance the workability, stability, and marketability of the product. If desired, digestate that has been pasteurized (through a process that includes, but is not limited to, thermal hydrolysis processing, thermal carbonization, or thermal alkaline hydrolysis) may be inoculated to further enhance marketability.

In a preferred embodiment, the inoculation is performed by injecting a fungicide. Other preferred embodiments may include, but are not limited to, inoculation by injecting beneficial microorganisms (such as aerobic or anaerobic nitrogen fixers) in mixed in concentrations ranging from 1 log to as high as 10 logs of added organisms, and preferably between 3-5 logs of added organisms) to produce characteristics in the digestate that are anti-fungal or produce suitable enzyme cofactors or nutrients to stabilize the digestate, the injection of vitamins (or the production of vitamins in the biosolids itself) to enhance the ability of plants grown using the digestate to thrive in adverse conditions, the injection of mycorrhizae to improve nutrient uptake, or the injection of chemicals to enhance the ability of the digestate to retain heat and prevent freezing during wintry conditions.

One of many objectives of this disclosure is to provide a system, process, and apparatus for developing products with pasteurized digestate. If desired, an apparatus may be employed to inoculate or enhance downstream digestate.

While it is envisioned that this disclosure will be used for the purposes of curing pasteurized digestate, other uses are also contemplated.

As used herein, the term "digestate" means the material remaining after the anaerobic digestion of a biodegradable feedstock. Anaerobic digestion produces two main products: digestate and biogas. If desired, digestate may be produced by an anaerobic digester of a wastewater treatment system. According to other aspects of this disclosure, digestate includes biosolids, organic waste, food waste, rendering, manure, or a combination thereof.

While the preferred embodiments of the disclosure are shown in the accompanying drawings, it is to be understood that said embodiments are susceptible to modification and alteration while still maintaining the spirit of the invention.

BRIEF DESCRIPTION OF THE DRAWINGS

The accompanying drawings which are incorporated in and form a part of the specification, illustrate several embodiments of the invention wherein.

DETAILED DESCRIPTION

This disclosure relates to a system, method, and apparatus for curing a product, such as digestate, that has been pasteurized (through a process which includes, but is not limited to, thermal hydrolysis, thermal alkaline hydrolysis, or thermal carbonization) to enhance the workability and marketability of the digestate. If desired, the pasteurized digestate is inoculated to further enhance characteristics of the finished product. In a preferred embodiment, the inoculation is performed by injecting a fungicide as an inoculum. According to one aspect of this disclosure, the cured and inoculated product (the inoculum is provided conditions to multiply by several logs) is packaged in plastic bags for marketing to consumers, who apply the product to landscaped areas, residential yards, and gardens.

The injected fungicide may be, for example, *Trichoderma*, which is a natural bio-fungicide. *Trichoderma* is effective at counteracting soil-borne diseases such as wilt, rot, and vine welt. It is a safe alternative to some chemical fungicides. Other alternative fungicides that may be utilized include, but are not limited to, *Ampelomyces quisqualis*, *Bacillus subtilis*, and *Gilocadium virens*. All of these can be added as inoculum, and the digestate provides a substrate for their growth and multiplication by many logs.

Other preferred embodiments may include, but are not limited to, inoculation by injecting beneficial microorganisms to produce characteristics in the digestate that are anti-fungal or produce suitable enzyme cofactors or nutrients to stabilize the digestate, the injection of one or more vitamins (or its production in the digestate) to enhance the ability of plants grown using the digestate to thrive in adverse conditions, the injection of mycorrhizae to improve nutrient uptake, or the injection of chemicals to enhance the ability of the digestate to retain heat and prevent freezing during wintry conditions.

In operation, digestate from an anaerobic digester may be pasteurized by, for example, thermal hydrolysis, thermal carbonization, or thermal alkaline hydrolysis. Subsequently, the pasteurized digestate is further processed by curing, and, if desired, further enhanced by introducing one or more inoculating agents, injecting one or more vitamins, and/or adding one or more enzymes or nutrients to produce desired characteristics in the finished product. In some approaches, reactions within the biosolids will convert an added substrate such as tryptophan into a beneficial compound, such as indole acetic acid, a beneficial plant vitamin/co-factor. Such transformation reactions can be encouraged by managing the curing process with additives. Other transformation reactions are also possible in accordance with this disclosure.

If desired, inhibitors and/or other chemicals can be added to the digestate. Inhibitors may be added to control reactions or the microorganisms cultured in the process. For example, nitrification inhibitors (such as Nitrapyrin) can be added, if desired, to prevent the conversion of ammonia substrate to nitrite, nitrate, and nitrous oxide products, all of which are more mobile and less 'plant accessible' than ammonia. According to another aspect of this disclosure, methanogenesis inhibitors can be added to generate beneficial reaction intermediates within the digestate.

In exemplary embodiments, an apparatus or system for delivering these enhancements to the pasteurized digestate may be provided. In other exemplary embodiments, a process for curing them is employed. Details of the curing process are described in more detail below.

The curing process disclosed herein is structurally similar to windrow composting. If desired, the horizontal length of each pile may be much greater than its horizontal width. If desired, the piles may be in the form of relatively long windrow-shaped lines that are parallel to each other. As used herein, the word "windrow" means a relatively long line of material heaped up by a machine. In operation, pasteurized digestate may be laid out in parallel, windrow-shaped piles that are in the range of from 1 to 3 meters tall, especially no more than 1.5 meters tall, and in the range of from 2 to 4 meters wide, especially no more than 3 meters wide.

The piles are turned shortly after being put down and at least 2 times per week thereafter, for a plurality of weeks. If desired, the piles may be turned by a front-end loader, a windrow turner, or other suitable equipment. The turning causes material which is at the top of a pile to be located at the bottom of the pile and vice versa. The turning process also results in agitation and mixing of material in the pile. During precipitation events, to prevent the digestate from becoming re-wetted, the piles are kept under a roof in a covered facility, or covered by a tarp or other flexible material.

If one or more tarps or other flexible material are used, the piles should remain uncovered as much as possible, when there is no precipitation, to maximize exposure of the piled digestate to ambient air, sunshine, and wind, to achieve the desired curing. In some exemplary embodiments of this disclosure, piles may be split evenly using automated cutters, piles may be turned using automated turners, dried using automated pressurized air, and/or covered as desired using automated retractable covers. The equipment for handling and processing the piles may be operated according to criteria obtained by one or more timers, one or more sensors, or other devices. Information that may be used to control the operation of the equipment includes, for example, moisture, conductivity, ammonia, pH, and maturity. If desired, the curing process may be automated to adjust and respond when the digestate falls out of a desired range, or should be guided to one or more of the desirable characteristic ranges shown in FIG. 1.

Figure 1:
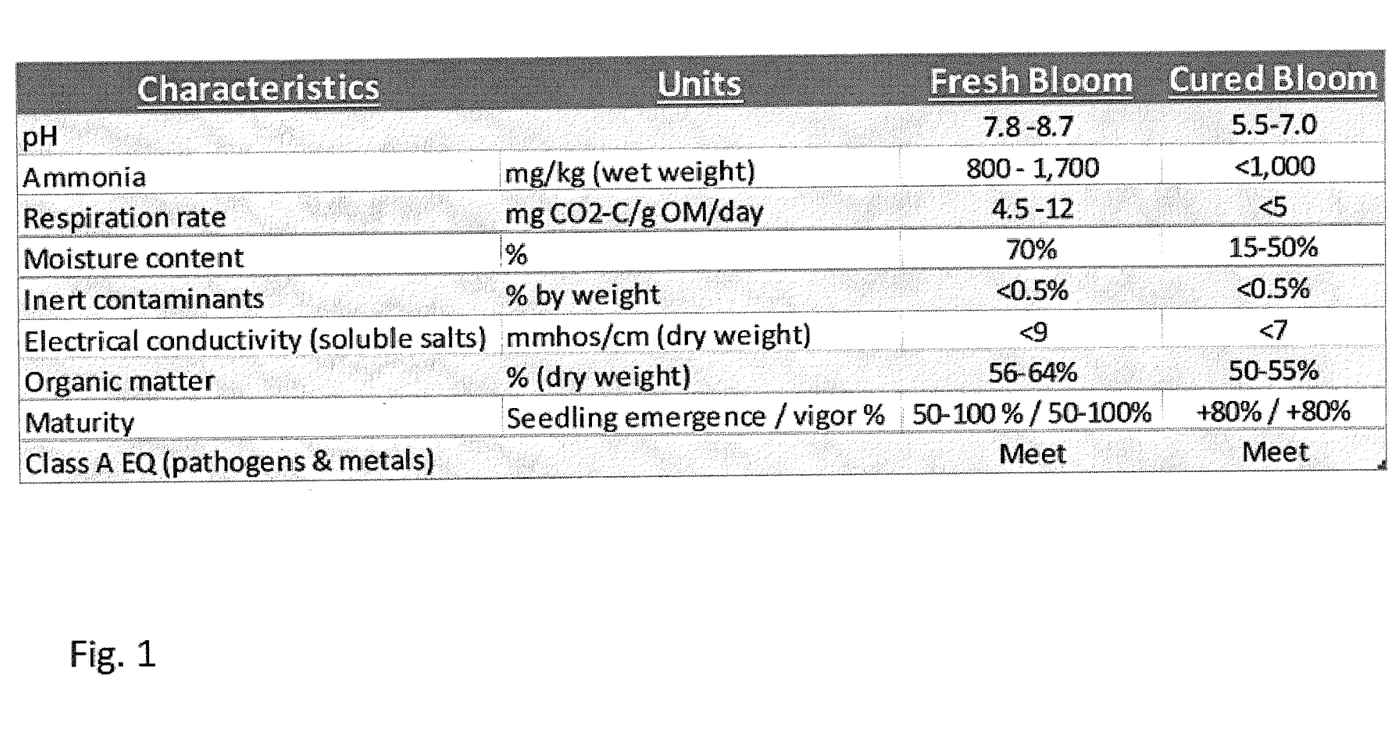
FIG. 1 is a chart showing typical parameters for uncured biosolids cake and for cured biosolids.

While FIG. 1 denotes BLOOM branded product, any cured digestate should have the desirable characteristics identified in that figure. If most of the characteristics and not all of the characteristics of FIG. 1 are attained, the material can also be considered 'cured'. For example, the ammonia concentration in the cured product depends on the initial ammonia concentration and can be greater than that observed in FIG. 1. Or, in some cases, the solids concentration may be greater than 50% to develop appropriate soil or fertilizer blends. Similarly, organic matter content can vary depending on the initial content.

The curing process described herein can be used to improve several product attributes (e.g., handle-ability, dryness, pH, ammonia concentration, stability) to improve the desirability and/or marketability of the finished product. FIG. 1 shows comparisons of key attributes of uncured biosolids cake and a cured biosolids product. Curing in accordance with this disclosure can also be used to reduce odor. Cured, pasteurized digestate in accordance with this disclosure may be particularly advantageous compared with uncured cake at sensitive sites, including but not limited to landscaping at businesses, private homes, and public spaces. The curing process may, if desired, be used to change the microbial community in the digestate.

The stability of the product can be monitored using a respirometer and/or a device that can measure the substrates or end products of respiration. Once a product is considered stable, it can then be bagged.

According to one aspect of this disclosure, a respirometer or compost maturity test which measures carbon dioxide and/or ammonia emissions from samples can be used to help determine when piles are finished curing, and/or to determine when piles are ready to be turned. Respiration rates from samples from the surface of a curing pile can be compared with rates from the center of the pile. When the rates diverge after the thorough mixing that accompanies turning, the piles are ready to be turned again. An analogous approach can be used for percent moisture (or percent dry solids) for samples from the surface versus the interior of a pile.

Uncured, dewatered digestate typically has low permeability to air toward the inside of the pile. As a result, at the beginning of the curing process, most of the curing, which includes drying and degradation of organic matter, occurs on the surface of the pile. Consequently, larger piles typically require more frequent turning. As the surface of a turned pile dries out, the material on the surface hardens. When the hardness reaches a certain point (which varies for each base material), little additional curing (drying and degradation) will occur and the pile should be turned. For a given digestate, a tool for measuring hardness, such as a soil penetrometer, can be used to generate a calibration curve that can be used to determine the optimal turning frequency for that material in the current ambient conditions. The resistance pressure of the material at several locations on the surface of an unturned pile can be measured regularly over the course of several days until the resistance pressure no longer significantly changes from day to day. Piles can then be turned when the resistance pressure reaches a predetermined percentage, for example 90%, of the maximum determined pressure.

Temperature can also be used to determine optimal turning frequency. The internal temperature of piles will increase after turning while the material is curing, but the temperature will decrease as the oxygen in the interior of the pile is consumed and aerobic degradation reactions lessen. Temperature readings at multiple locations in piles can be taken at regular intervals, for example throughout each day over the course of several days, to determine maximum and minimum internal pile temperatures in the current ambient conditions. When piles are subsequently turned, the temperature can be measured at multiple locations in the pile and when the internal temperature returns to a predetermined percentage, e.g. 10%, of the temperature difference from the previously determined minimum temperature, it may be determined that the pile is ready to be turned. This temperature-calibrating process may need to be repeated throughout the year as ambient conditions change.

In some exemplary embodiments, the process for curing digestate may include one or more of the acts of (a) curing the digestate in piles that are no more than 3 meters tall and no more than 4 meters wide, (b) turning the piles shortly after they are laid out, and at least 2 times per week afterward, and/or (c) keeping the piles covered during precipitation events, and uncovered at other times. In some such exemplary embodiments, the act of curing may further include combining the digestate with beneficial fungicide, microbes, vitamins, mycorrhizae, or chemicals. In other exemplary embodiments, heat, including but not limited to recycled waste heat generated from a wastewater treatment system or other process or solar energy, may be used for accelerating the drying process which occurs during curing. In other exemplary embodiments the ideal range for using waste heat for drying and maintaining curing reactions may be at a temperature of 70 degrees Celsius or above. In other cases, curing reactions using added heat may occur at a temperature best suited for the growth of an inoculum. The acceleration of drying could occur in a static or a moving dryer. For example in a static process, heat can be introduced in pipes added under the curing piles or in hot water bladders or exchange units. In a moving dryer, a conveyor could be used in the form of a belt or a screw.

Figure 2:
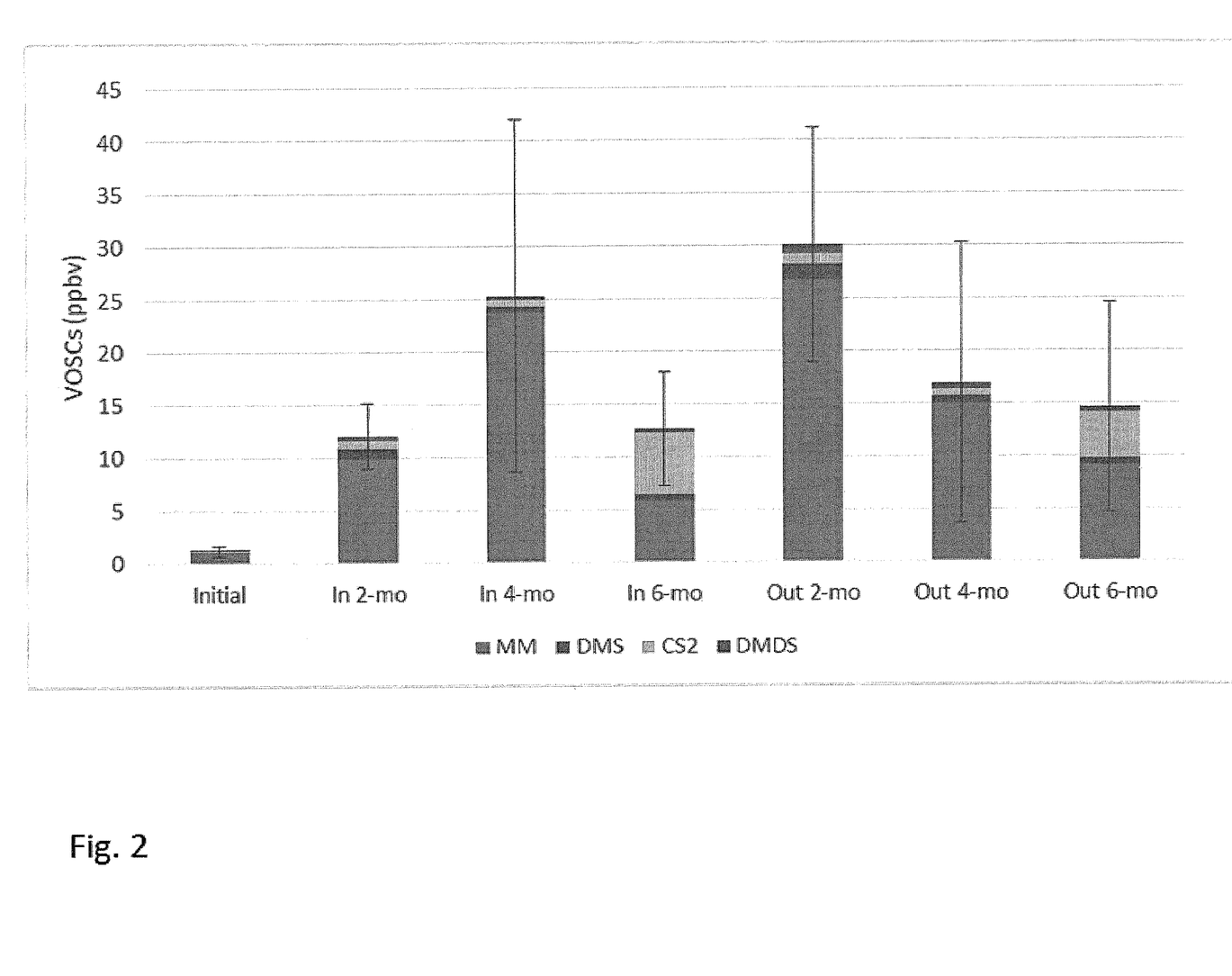
FIG. 2 is a histogram illustrating fluctuations and standard deviations for volatile organic sulfur compound emissions over time for bags stored inside and outside.

The results of bagging an exemplary embodiment of the present disclosure are as follows. FIG. 2 shows results for the concentration of various volatile organic sulfur compounds (VOSCs) from the headspace above cured material shortly after being bagged ("initial") and after two, four, and six months for bags stored inside ("in") and outside ("out"). Despite small fluctuations in VOSCs emissions over a 6-month period, the data show that curing of pasteurized digestate in accordance with this disclosure produces a stable product that can be safely bagged and stored until final use without deterioration of odor characteristics. In addition, the cured material represented in FIG. 2 showed no detectable signs of fungi or other microbial growth.

Some exemplary embodiments of the disclosure may involve an apparatus for injecting beneficial product onto a conveyance system for transporting digestate. The apparatus may include a storage tank for housing beneficial product, a pump for moving the nutrients, and an orifice for ejecting the nutrients onto the conveyance system.

Other exemplary embodiments may involve a system for curing digestate which involves an area, wherein digestate is cured in piles, prior to the digestate being injected with beneficial products via a conveyance system and apparatus for injection, a process involving the use of permeable floors, beds, or grates to allow for drainage of moisture from or the addition of pressurized air to curing piles, a process wherein nutrients, beneficial bacteria, fungi, or growth factors are produced by microorganisms being cured within the piles, a process wherein the uncovered pile may be in a partially or fully enclosed structure with active humidity management using fans or other such approaches, a process wherein the digestate has been previously pasteurized using a thermal or chemical process and subject to anaerobic or aerobic digestion, or any combination thereof. Inhibitors can also be added to prevent the growth of some organisms at the expense of other organisms.

Figure 3:
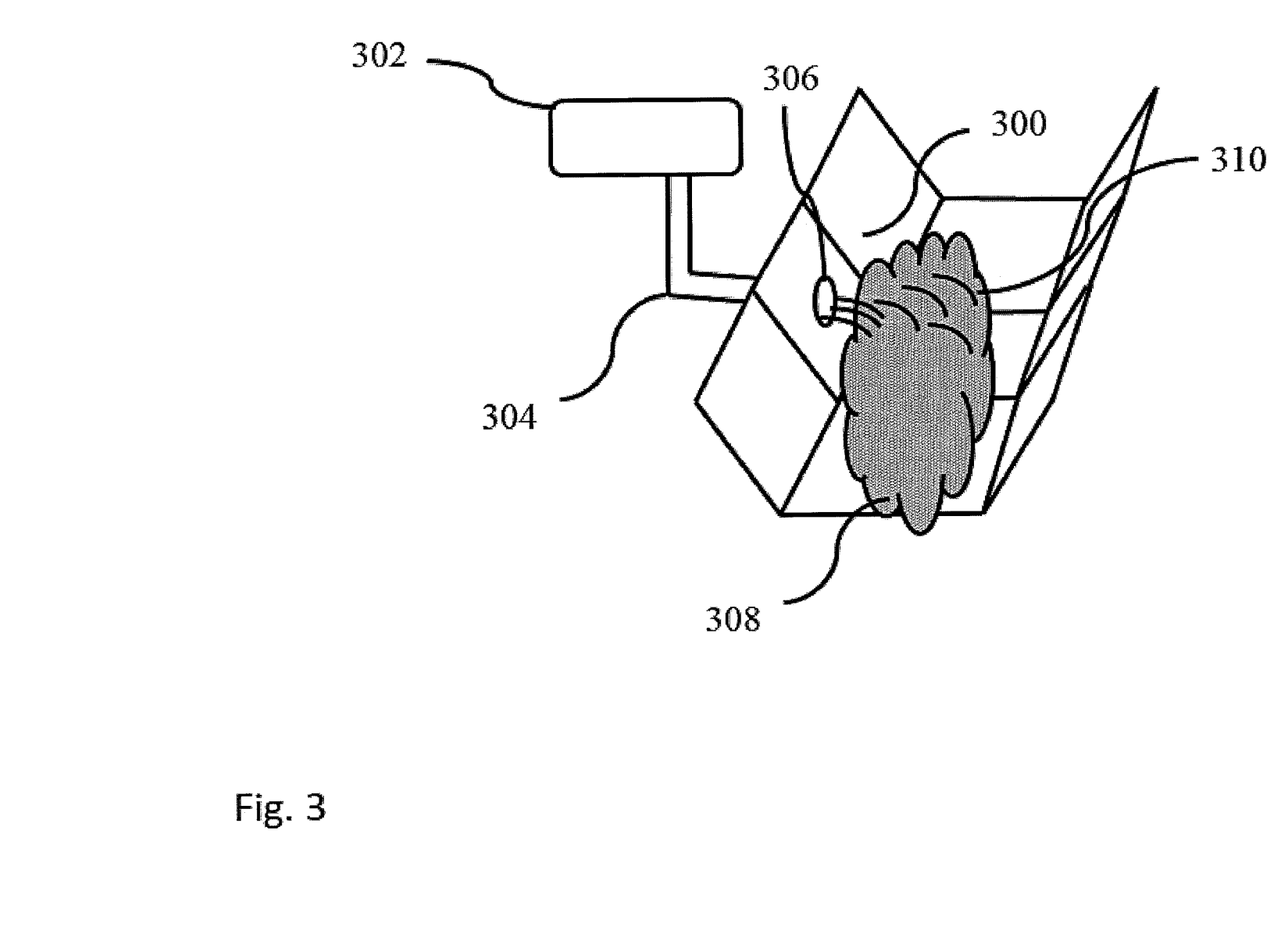
FIG. 3 shows an exemplary embodiment of an apparatus for inoculating or enhancing product or biosolids downstream of a pasteurization process.

In some exemplary embodiments of this disclosure, an apparatus is provided for further enhancing produced digestate with the introduction of helpful enzymes, additives, mycorrhizae, vitamins, or nutrients. Inhibitors can also be added to prevent the growth of some organisms at the expense of other organisms. One exemplary embodiment, illustrated in FIG. 3, has a conveyance system 300 downstream of a pasteurization process (not illustrated). The pasteurization process is associated with an anaerobic digester (not illustrated) of a wastewater treatment system. Thus, in the illustrated embodiment, the conveyance system 300 is located downstream from the anaerobic digester. An inoculating agent or nutrients may be supplied from a tank 302. The tank 302 pumps the inoculating agent or nutrients along a path 304 before disbursing it or them from an injection orifice 306 into or onto the pasteurized digestate 308 with the mixture after the point of injection 310 being enhanced.

Figure 4:
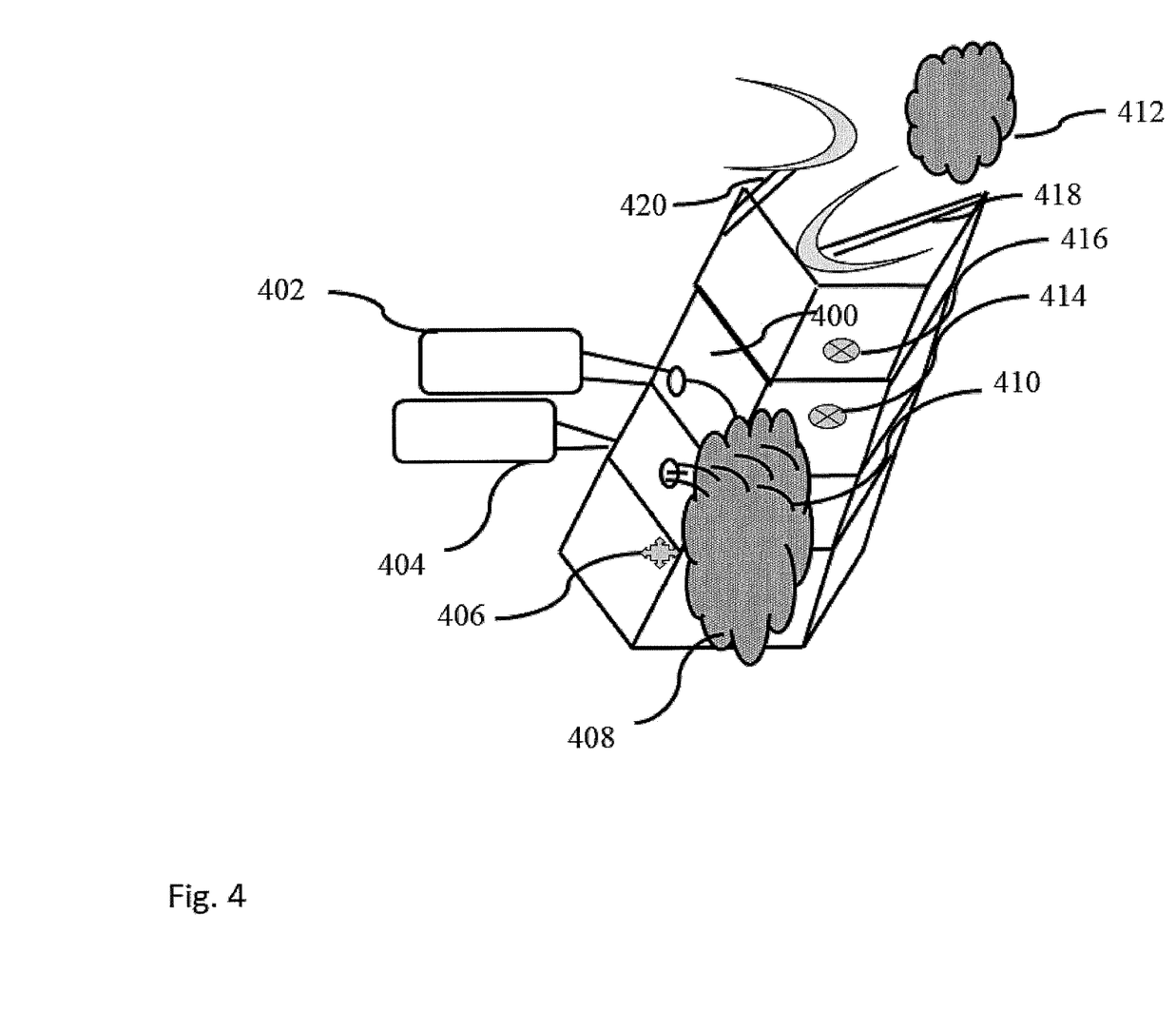
FIG. 4 shows an exemplary embodiment of an apparatus for inoculating, drying, cutting or enhancing product or biosolids downstream of a pasteurization process.

In other exemplary embodiments of this disclosure an apparatus is provided for further enhancing produced digestate with the introduction of helpful enzymes, additives, mycorrhizae, vitamins, or nutrients, and additional automated tools for splitting piles of digestate, drying piles quicker with air, or sensing digestate conditions. One exemplary embodiment, illustrated in FIG. 4, has a conveyance system 400 downstream of a pasteurization process (not illustrated). The pasteurization process is associated with an anaerobic digester (not illustrated) of a wastewater treatment system. Thus, in the illustrated embodiment, the conveyance system 400 is located downstream from the anaerobic digester. An inoculating agent or nutrients may be supplied from a tank 402. Drying air may also be supplied from a pressurized air hose 404, drying the pasteurized digestate 408 in some cases after one or more sensors 406 (which may include but are not limited to respirometers, thermometers, penetrometers or pH meters) detects one or more criteria at a range where drying would be beneficial. The mixture after the point of injection from the air hose 404 or inoculating tank 402 now being an enhanced digestate mixture 410, may be measured by additional sensors 414, 416 including but not limited to proximity sensors, scales, moisture sensors or any other sensors that would be beneficial in autonomously activating additional automated tools such as digestate pile splitting cutters 418, 420, which can cut apart digestate piles 412, as needed.

Figure 5:
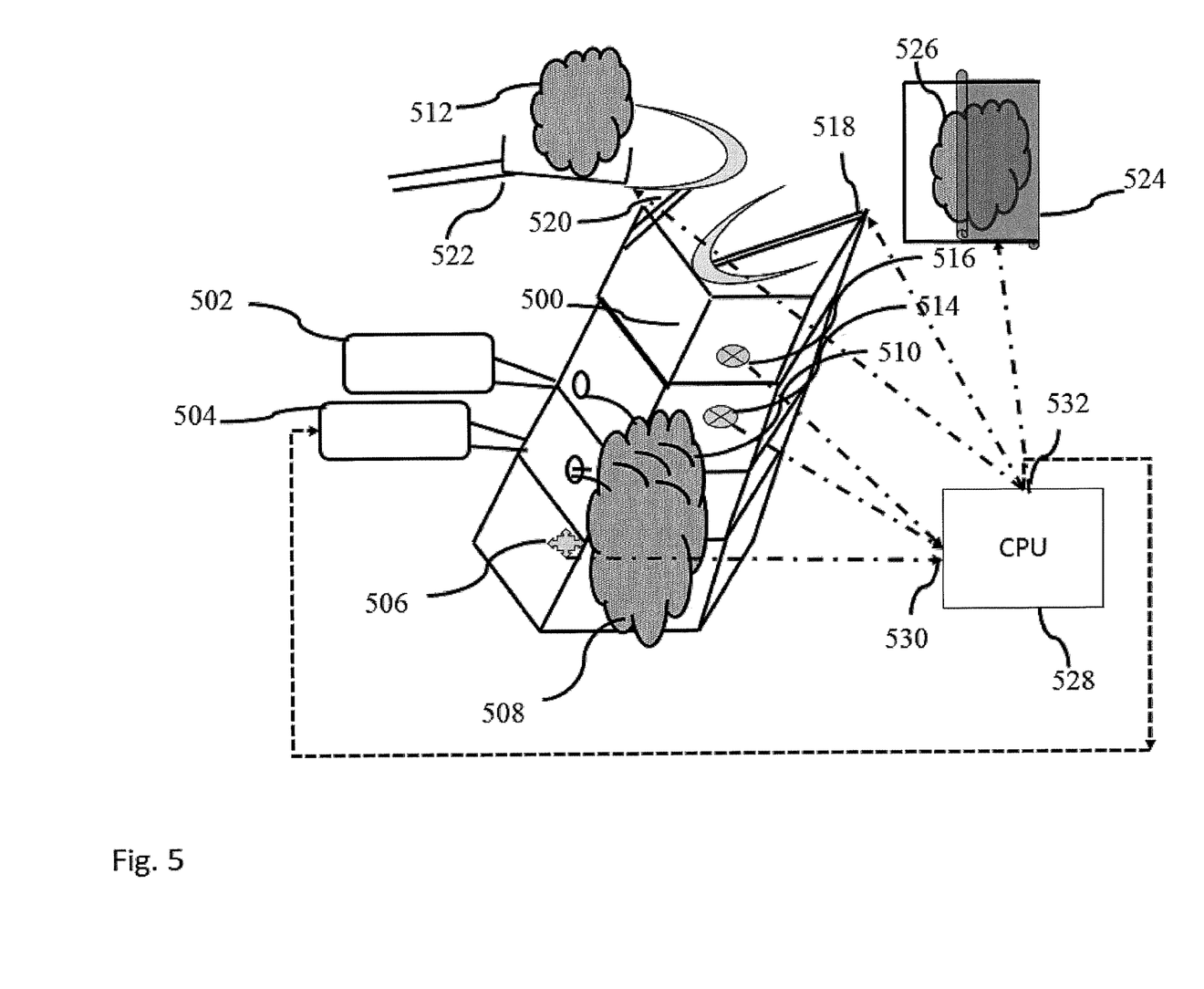
FIG. 5 shows an exemplary embodiment of a system for inoculating, cutting, rotating, drying, covering or enhancing product or biosolids downstream of a pasteurization process.

In some other exemplary embodiments of this disclosure, an apparatus or system is provided for further enhancing produced digestate with the introduction of helpful enzymes, additives, mycorrhizae, vitamins, or nutrients, and additional automated tools for splitting piles of digestate, drying piles quicker with air, or sensing digestate conditions. One exemplary embodiment, illustrated in FIG. 5, has a conveyance system 500 downstream of a pasteurization process (not illustrated). The pasteurization process is associated with an anaerobic digester (not illustrated) of a wastewater treatment system. Thus, in the illustrated embodiment, the conveyance system 500 is located downstream from the anaerobic digester. An inoculating agent or nutrients may be supplied from a tank 502. Drying air may also be supplied from a pressurized air hose 504, drying the pasteurized digestate 508 in some cases after one or more sensors 506 (which may include but are not limited to respirometers, thermometers, penetrometers or pH meters) detects one or more criteria at a range where drying would be beneficial. The mixture after the point of injection from the air hose 504 or inoculating tank 502 now being an enhanced digestate mixture 410, may be measured by additional sensors 514, 516 including but not limited to proximity sensors, scales, moisture sensors or any other sensors that would be beneficial in autonomously activating additional automated tools such as automated digestate pile splitting cutters 518, 520, automated digestate turners 522, or automated retractable digestate covers 524 which can cut apart, move, rotate and turn additional digestate piles 512, 526 as needed. Ideally the tools would operate in response to sensors sending a signal 530, to a computing system 528, which then sends a signal 532, indicating what adjustments the process must make to achieve the desired characteristic range to one or more tools including but not limited to said tools for cutting, rotating, drying, inoculating or covering the digestate as needed.

It is understood that the various disclosed embodiments are shown and described above to illustrate different possible features of the disclosure and the varying ways in which these features may be combined. Apart from combining the features of the above embodiments in varying ways, other modifications are also considered to be within the scope of the disclosure. The disclosure is not intended to be limited to the preferred embodiments described above, but rather is intended to be limited only by the claims set out below. Thus, the disclosure encompasses all alternate embodiments that fall literally or equivalently within the scope of these claims.

The invention is not limited to the structures, methods and instrumentalities described above and shown in the drawings. The invention is defined by the claims set forth below. What is claimed and desired to be protected by Letters Patent of the United States is:

The invention claimed is:

1. A process for producing a cured product for use in a landscaped area, a residential yard, or a garden, the process comprising the acts of:
   providing a pasteurized digestate;
   forming the pasteurized digestate into one or more piles;
   turning, agitating, or mixing the one or more piles; and
   curing the pasteurized digestate in the one or more piles to produce the cured product, wherein the curing includes drying and degradation of the pasteurized digestate in the one or more piles, and wherein, during the curing of the pasteurized digestate, the one or more piles are covered, uncovered, or in a partially-enclosed or fully-enclosed structure.

2. The process of claim 1, wherein the one or more piles are no less than 1 meter tall and no more than 3 meters tall, and no less than 2 meters wide and no more than 4 meters wide.

3. The process of claim 2, wherein the one or more piles are no more than 1.5 meters tall and no more than 3 meters wide.

4. The process of claim 1, wherein the step of providing the pasteurized digestate includes (A) a step of obtaining the pasteurized digestate from an anaerobic digester of a wastewater treatment system and (B) a thermal hydrolysis step in which the pasteurized digestate is heated to a temperature greater than 100° C., a thermal alkaline hydrolysis step in which the pasteurized digestate is thermally hydrolysed in the presence of an alkaline material, or a thermal carbonization step in which the pasteurized digestate is thermally carbonized, and wherein the thermal hydrolysis step, the thermal alkaline hydrolysis step, or the thermal carbonization step occurs before the step of forming the pasteurized digestate into the one or more piles.

5. The process of claim 4, further comprising inoculating the pasteurized digestate.

6. The process of claim 4, further comprising packaging the cured product into bags.

7. The process of claim 4, wherein the turning of the one or more piles causes material at the tops of the one or more piles to be located at the bottoms of the one or more piles and vice versa, and results in agitation and mixing of the material in the one or more piles.

8. The process of claim 4, further comprising combining material in the one or more piles with beneficial fungicide, microbes, vitamins, mycorrhizae, or chemicals.

9. The process of claim 4, further comprising heating the pasteurized digestate at a temperature of 70° C. or more, and wherein the heating includes using waste heat or solar energy, either directly or using a heat exchanger or heat pump.

10. The process of claim 1, wherein nutrients, beneficial bacteria, fungi, or growth factors are produced by microorganisms being cured within the one or more piles.

11. The process of claim 1, wherein an uncovered pile is located in a partially or fully enclosed structure with active humidity management.

12. The process of claim 1, where the one or more piles are placed on permeable floors, beds or grates to allow for drainage of moisture or the addition of pressurized air.

13. The process of claim 1, wherein a sensor is used to monitor the turning of the one or more piles or the stability of the one or more piles.

14. The process of claim 13, wherein the sensor is a respirometer, a moisture analyzer, a thermal gradient detector, a penetrometer, a hardness detector, or a device for measuring substrates or products.

15. The process of claim 1, wherein the curing of the pasteurized digestate includes accelerating the drying of the pasteurized digestate.

16. A process for producing a cured product for a landscaped area, a residential yard, or a garden, comprising:
   providing a pasteurized digestate;
   providing an area for curing the pasteurized digestate;
   forming the pasteurized digestate into one or more piles;
   turning, agitating, or mixing the one or more piles;
   combining material in the one or more piles with beneficial fungicide, beneficial bacteria, microbes, vitamins, mycorrhizae, or chemicals; and
   curing the pasteurized digestate in the one or more piles to produce the cured product, wherein the curing includes drying and degradation of the pasteurized digestate in the one or more piles, and wherein, during the curing of the pasteurized digestate, the one or more piles are covered, uncovered, or in a partially-enclosed or fully-enclosed structure wherein the step of providing the pasteurized digestate includes a step of obtaining the pasteurized digestate from an anaerobic digester of a wastewater treatment system.

17. The process of claim 16, wherein the digestate is cured and pasteurized utilizing an automated process wherein digestate is cut, rotated, dried, or inoculated at set intervals.

18. The process of claim 16, wherein the digestate is cured and pasteurized utilizing an automated process, wherein the digestate is cut, rotated, dried, inoculated and covered in response to one or more sensors detecting a characteristic of the digestate and sending a signal to a processor controlling the automated process, indicating adjustments for achieving a desired characteristic range.

19. The process of claim 16, wherein the one or more piles are located in a partially or fully enclosed structure with active humidity management.

20. The process of claim 16, further comprising using waste heat or solar energy for drying, either directly or using a heat exchanger or heat pump.

21. The process of claim 16, wherein the one or more piles are no less than 1 meter tall and no more than 3 meters tall, and no less than 2 meters wide and no more than 4 meters wide.

22. The process of claim 16, wherein the curing of the pasteurized digestate includes accelerating the drying of the pasteurized digestate.

* * * * *